United States Patent
Kawai et al.

(10) Patent No.: US 11,796,676 B2
(45) Date of Patent: Oct. 24, 2023

(54) APPARATUS AND METHOD FOR GENERATING AND PROVIDING DETECTION MODEL, AND NON-TRANSITORY STORAGE MEDIUM

(71) Applicant: NEC Corporation, Tokyo (JP)

(72) Inventors: Masahiro Kawai, Tokyo (JP); Shinichi Morimoto, Tokyo (JP); Masaru Eto, Tokyo (JP); Toshinori Takemura, Tokyo (JP); Masayuki Ariyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/692,367

(22) Filed: Mar. 11, 2022

(65) Prior Publication Data

US 2022/0299636 A1 Sep. 22, 2022

(30) Foreign Application Priority Data

Mar. 19, 2021 (JP) ................. 2021-045902

(51) Int. Cl.
*G01S 17/04* (2020.01)
*G06F 21/31* (2013.01)
*G01N 23/10* (2018.01)
*G06N 20/00* (2019.01)

(52) U.S. Cl.
CPC .............. *G01S 17/04* (2020.01); *G01N 23/10* (2013.01); *G06F 21/31* (2013.01); *G06N 20/00* (2019.01)

(58) Field of Classification Search
CPC ........ G01S 17/04; G01N 23/10; G01N 22/00; G06F 21/31; G06N 20/00
USPC ........................................................ 250/221
See application file for complete search history.

(56) References Cited

U.S. PATENT DOCUMENTS

| 2014/0168013 A1* | 6/2014 | Wang | G01S 13/89 342/385 |
| 2020/0393594 A1 | 12/2020 | Obata et al. | |

FOREIGN PATENT DOCUMENTS

JP 2020-204513 A 12/2020

* cited by examiner

*Primary Examiner* — Que Tan Le
*Assistant Examiner* — Mai Thi Ngoc Tran
(74) *Attorney, Agent, or Firm* — Sughrue Mion, PLLC

(57) ABSTRACT

For easily setting, for each of a plurality of detection apparatuses, a target object detected by the detection apparatus, a model providing apparatus including: a storage unit storing a machine learning model detecting a plurality of detection target objects, based on a received signal of a reflected wave of an electromagnetic wave with a wavelength equal to or greater than 30 micrometers and equal to or less than 1 meter; a request reception unit receiving a request for a detection model detecting the detection target object, based on the received signal; a selection unit selecting at least one out of a plurality of detection target objects for each request; generation unit generating a detection model detecting a selected detection target object and not detecting an unselected detection target object, based on the machine learning model; and a transmission unit transmitting the generated detection model to a detection apparatus is provided.

11 Claims, 10 Drawing Sheets

FIG. 4

DETECTION TARGET OBJECT INFORMATION

| DETECTION TARGET OBJECT | TARGET COUNTRY | KEYWORD |
|---|---|---|
| PISTOL | COUNTRY A, COUNTRY B, . . . | DANGEROUS ARTICLE, PISTOL, FIREARMS, GUN, SAFETY OF LIFE, . . . |
| CAMERA | ALL COUNTRIES | INFORMATION SECURITY, CAMERA, IMAGE, INFORMATION LEAKAGE, SECRET, SERVER ROOM, . . . |
| . . . | . . . | . . . |

FIG. 8

USER CONTRACT INFORMATION

| USER IDENTIFICATION INFORMATION | CONTRACT CONTENT | . . . . |
|---|---|---|
| 0013132 | PLAN A | . . . . |
| 1127128 | PLAN A | . . . . |
| 0000981 | PLAN B | . . . . |
| ⋮ | ⋮ | ⋮ |

FIG. 10

USER SETTING INFORMATION

| USER IDENTIFICATION INFORMATION | DETECTION APPARATUS IDENTIFICATION INFORMATION | SET DETECTION TARGET OBJECT |
|---|---|---|
| 0013132 | D001 | PISTOL, KNIFE, ··· |
| | D002 | CAMERA, SMARTPHONE, ··· |
| | ⋮ | ⋮ |
| ⋮ | ⋮ | ⋮ |

APPARATUS AND METHOD FOR GENERATING AND PROVIDING DETECTION MODEL, AND NON-TRANSITORY STORAGE MEDIUM

TECHNICAL FIELD

The present invention relates to a model providing apparatus, a model providing method, and a program.

BACKGROUND ART

A technology related to the present invention is disclosed in Japanese Patent Application Publication No. 2020-204513 (Patent Document 1). Patent Document 1 discloses a technology for inspecting belongings by using a radio wave including at least a wave with a wavelength between 1 millimeter and 30 millimeters, the technology detecting a suspicious person carrying a dangerous article through primary screening for collectively and roughly inspecting many people and performing detailed inspection on the detected suspicious person through secondary screening.

DISCLOSURE OF THE INVENTION

While belongings inspection is performed at various locations, a target object to be detected may vary from one location to another. For example, there may be a location where detection of dangerous articles such as a pistol and a knife is necessary, and there may be a location where detection of imaging apparatuses such as a camera and a smartphone is necessary for information leakage prevention.

As a technique for meeting all possible needs for each location, a means for generating a detection model that can detect every possible target object may be considered. However, the means may cause inconvenience that a detection apparatus holds information for detecting a target object unnecessary to be detected at a location where the apparatus is installed and performs processing of detecting a target object unnecessary to be detected at the location.

Specifically, the means may cause inconvenience that a detection apparatus installed at a location where detection of dangerous articles such as a pistol and a knife is necessary and detection of imaging apparatuses such as a camera and a smartphone is unnecessary holds information for detecting not only dangerous articles such as a pistol and a knife but also imaging apparatuses such as a camera and a smartphone and detects the imaging apparatuses. As a result, such unnecessary processing may cause problems such as increase in a waiting time for a belongings inspection and increase in the cost required for the detection apparatus due to overdesign of the detection apparatus.

An object of the present invention is to enable, for each of a plurality of detection apparatuses, easy setting of a target object detected by the detection apparatus.

The present invention provides a model providing apparatus including:

a storage means for storing a machine learning model detecting a plurality of detection target objects, based on a received signal of a reflected wave of an electromagnetic wave with a wavelength equal to or greater than 30 micrometers and equal to or less than 1 meter;

a request reception means for receiving a request for a detection model detecting the detection target object, based on the received signal;

a selection means for selecting at least one out of a plurality of the detection target objects for the each request;

a generation means for generating the detection model detecting the selected detection target object and not detecting the unselected detection target object, based on the machine learning model; and a transmission means for transmitting the generated detection model to a detection apparatus.

Further, the present invention provides a model providing method including, by a computer:

storing a machine learning model detecting a plurality of detection target objects, based on a received signal of a reflected wave of an electromagnetic wave with a wavelength equal to or greater than 30 micrometers and equal to or less than 1 meter;

receiving a request for a detection model detecting the detection target object, based on the received signal;

selecting at least one out of a plurality of the detection target objects for the each request;

generating the detection model detecting the selected detection target object and not detecting the unselected detection target object, based on the machine learning model; and transmitting the generated detection model to a detection apparatus.

Further, the present invention provides a program causing a computer to function as:

a storage means for storing a machine learning model detecting a plurality of detection target objects, based on a received signal of a reflected wave of an electromagnetic wave with a wavelength equal to or greater than 30 micrometers and equal to or less than 1 meter;

a request reception means for receiving a request for a detection model detecting the detection target object, based on the received signal;

a selection means for selecting at least one out of a plurality of the detection target objects for the each request;

a generation means for generating the detection model detecting the selected detection target object and not detecting the unselected detection target object, based on the machine learning model; and a transmission means for transmitting the generated detection model to a detection apparatus.

The present invention enables, for each of a plurality of detection apparatuses, easy setting of a target object detected by the detection apparatus.

BRIEF DESCRIPTION OF THE DRAWINGS

FIG. 4 is a diagram schematically illustrating an example of information processed by the model providing apparatus according to the first example embodiment.

FIG. 8 is a diagram schematically illustrating an example of information processed by a model providing apparatus according to a second example embodiment.

FIG. 10 is a diagram schematically illustrating an example of information processed by the model providing apparatus according to the third example embodiment.

DESCRIPTION OF EMBODIMENTS

Example embodiments of the present invention are described below by using drawings. Note that, in every drawing, similar components are given similar signs, and description thereof is omitted as appropriate.

First Example Embodiment

Outline

Figure 1:
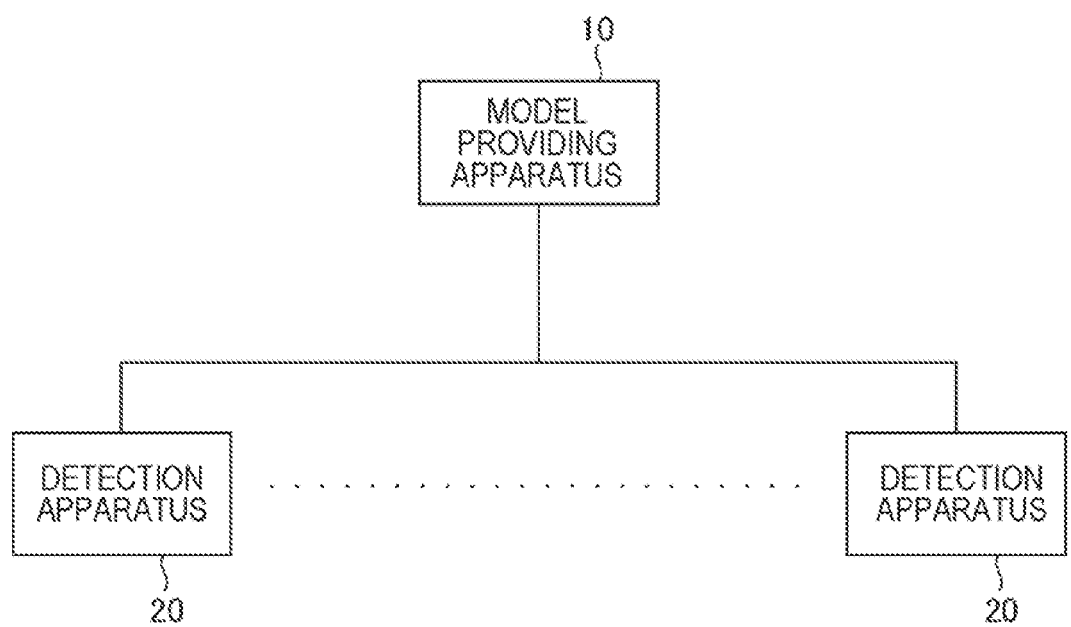
FIG. 1 is a diagram for illustrating an outline of a system according to a first example embodiment.

An outline of a system according to the present example embodiment is described by using FIG. 1. According to the present example embodiment, a machine learning model that can detect a plurality of detection target objects is generated in advance and is stored in a model providing apparatus 10 (server). The machine learning model can be considered as a set of a plurality of models that can detect a plurality of detection target objects.

When accepting a download request for a detection model, the model providing apparatus 10 selects at least one out of a plurality of detection target objects for each request. Next, the model providing apparatus generates a detection model for detecting the selected detection target object and for not detecting an unselected detection target object, based on the aforementioned machine learning model. Then, the model providing apparatus 10 transmits the generated detection model to a predetermined detection apparatus 20.

Such a model providing apparatus 10 according to the present example embodiment can generate and provide a detection model detecting a suitable detection target object for each detection apparatus 20, based on a machine learning model that can detect a plurality of detection target objects.

Hardware Configuration

Figure 2:
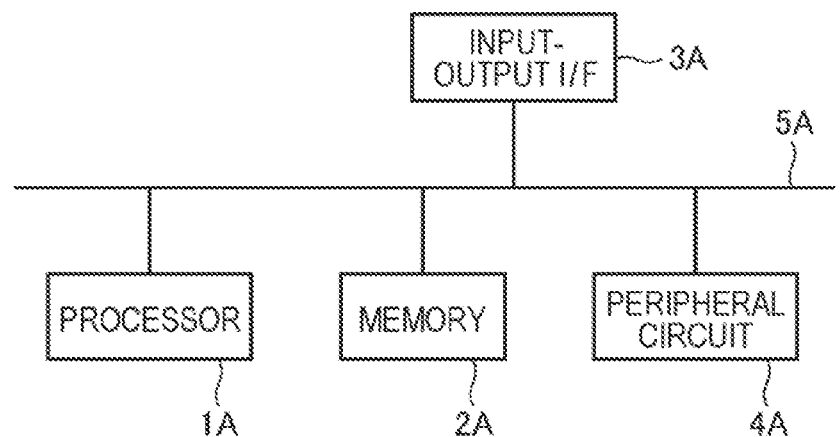
FIG. 2 is a diagram illustrating an example of a hardware configuration of an apparatus according to the first example embodiment.

Next, an example of a hardware configuration of each of the model providing apparatus 10 and the detection apparatus 20 is described. FIG. 2 is a diagram illustrating a hardware configuration example of an apparatus, which may implement either or both of the model providing apparatus 10 and the detection apparatus 20. Each functional unit included in the model providing apparatus 10 and the detection apparatus 20 (as will be described in relation to FIGS. 3 and 6, respectively, further herein) is implemented by any combination of hardware and software centering on a central processing unit (CPU), a memory, a program loaded in the memory, a memory unit storing the program (whether previously stored thereon or downloaded from a storage medium such as a compact disc (CD) or from a server on the Internet), such as a hard disk, and a network connection interface in any computer. It should be understood by a person skilled in the art that various modifications to the above apparatus can be made without departing from the scope of the invention.

As illustrated in FIG. 2, the apparatus, which may implement either or both of the model providing apparatus 10 and the detection apparatus 20, includes a processor 1A, a memory 2A, an input-output interface 3A, a peripheral circuit 4A, and a bus 5A. The peripheral circuit 4A includes various modules. The model providing apparatus 10 and/or the detection apparatus 20 may omit the peripheral circuit 4A. The model providing apparatus 10 may be configured as a plurality of physically and/or logically separated sub-apparatuses or may be configured as a physically and logically integrated single apparatus. Similarly, the detection apparatus 20 may be configured with a plurality of physically and/or logically separated sub-apparatuses. When an apparatus is configured as a plurality of physically and/or logically separated sub-apparatuses, each of the plurality of sub-apparatuses may include the aforementioned hardware configuration illustrated in FIG. 2.

The bus 5A is a data transmission channel for the processor 1A, the memory 2A, the peripheral circuit 4A, and the input-output interface 3A to transmit and receive data to and from one another. Examples of the processor 1A include arithmetic processing units such as a CPU and a graphics processing unit (GPU). Examples of the memory 2A include memories such as a random access memory (RAM) and a read only memory (ROM). The input-output interface 3A includes an interface for acquiring information from other components such as an input apparatus, an external apparatus, an external server, an external sensor, an electromagnetic wave transmission-reception apparatus, and the like and an interface for outputting information to other components such as an output apparatus, the external apparatus, the external server, the electromagnetic wave transmission-reception apparatus, and the like. Examples of the input apparatus include a keyboard, a mouse, and a microphone. Examples of the output apparatus include a display, a speaker, a printer, and a mailer. The processor 1A can give an instruction to each other component and perform an operation, based on the operation result by the other components.

Functional Configuration of Model Providing Apparatus 10

Figure 3:
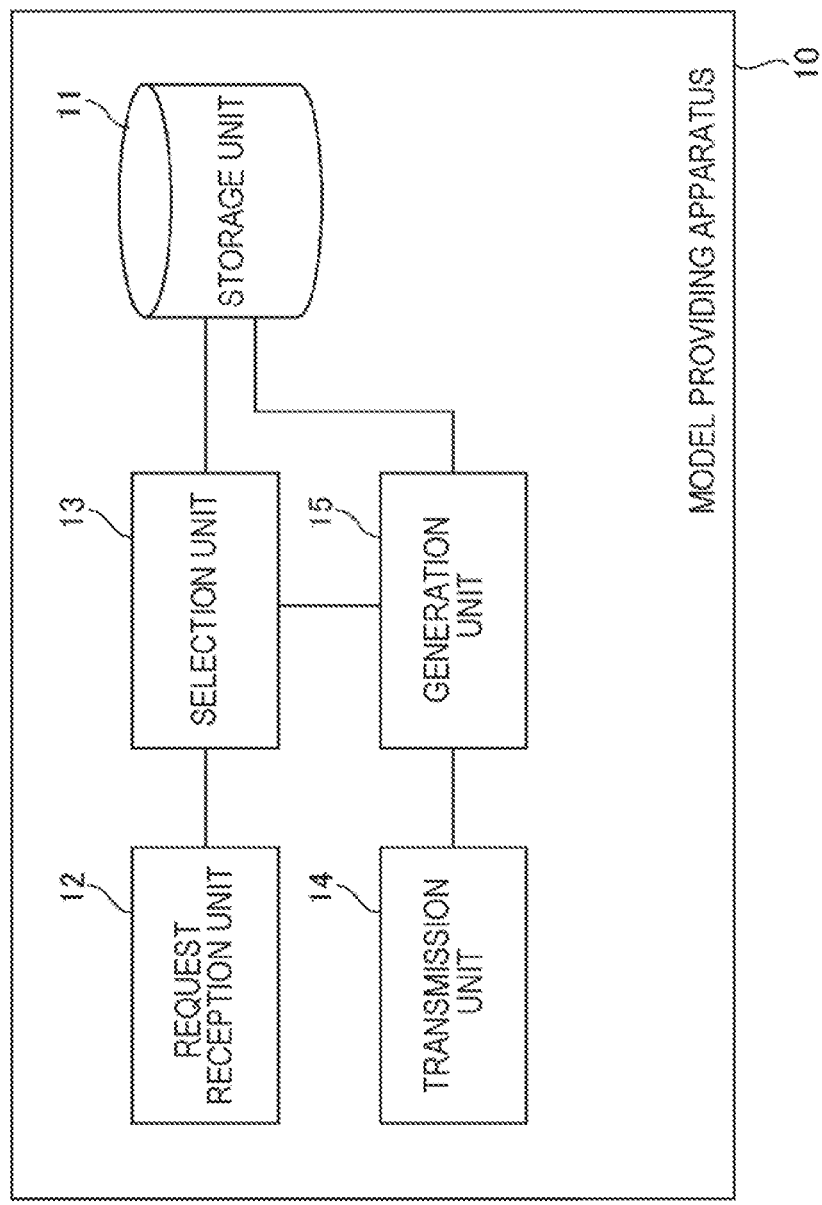
FIG. 3 is a diagram illustrating an example of a functional block diagram of a model providing apparatus according to the first example embodiment.

Next, a functional configuration of the model providing apparatus 10 is described. As illustrated in FIG. 3, the model providing apparatus 10 includes a storage unit 11, a request reception unit 12, a selection unit 13, a transmission unit 14, and a generation unit 15.

The storage unit 11 stores a machine learning model detecting a plurality of detection target objects, based on a received signal of a reflected wave of an electromagnetic wave with a wavelength equal to or greater than 30 micrometers and equal to or less than 1 meter (such as a microwave, a millimeter wave, or a terahertz wave). A detection model provided for each of the plurality of detection apparatuses 20 is generated based on the machine learning model.

The machine learning model may perform the aforementioned detection by processing a transmission image generated based on a signal of a reflected wave or may perform the aforementioned detection by processing a received signal of a reflected wave without imaging. The signal of the reflected wave may be received, for example, from an electromagnetic wave transmission-reception unit as will be described in relation to FIGS. 6 and 7, further herein, though it is not limited thereto. The transmission image may be received, for example, from an detection unit as will be described in relation to FIGS. 6 and 7, further herein, though it is not limited thereto. An example is described below.

First Example

A machine learning model in the example performs the aforementioned detection by processing a transmission image generated based on a signal of a reflected wave. A feature value of the shape of each of a plurality of detection target objects is generated and registered by advance preparation. For example, feature values of dangerous articles such as a pistol and a knife, feature values of imaging apparatuses such as a camera, a smartphone, a tablet terminal, and a mobile phone, and feature values of objects prohibited to be brought into a predetermined region, such as a PET bottle, a lighter, and a match, are registered.

The machine learning model in the example achieves detection of a detection target object by detecting a feature value of the shape of each of a plurality of preregistered detection target objects from a transmission image generated based on a signal of a reflected wave. A generation technique of a feature value of the shape of each of a plurality of detection target objects and a technique of detecting a predetermined feature value from a transmission image are not particularly limited, and every possible technology may be employed.

Second Example

A machine learning model in the example performs the aforementioned detection by processing a signal of a reflected wave without imaging. A feature value appearing in a signal of the aforementioned reflected wave of each of a plurality of detection target objects (a reflected wave feature value) is generated and registered by advance preparation. For example, feature values of dangerous articles such as a pistol and a knife, feature values of imaging apparatuses such as a camera, a smartphone, a tablet terminal, and a mobile phone, and feature values of objects prohibited to be brought into a predetermined region, such as a PET bottle, a lighter, and a match, are registered.

The machine learning model in the example achieves detection of a detection target object by detecting a reflected wave feature value of each of a plurality of preregistered detection target objects from a signal of a reflected wave. A generation technique of a reflected wave feature value and a technique of detecting a predetermined feature value from a transmission image are not particularly limited, and every possible technology may be employed.

The request reception unit 12 receives a request for a detection model detecting a detection target object, based on a received signal of a reflected wave of an electromagnetic wave with a wavelength equal to or greater than 30 micrometers and equal to or less than 1 meter. For example, when a user inputs the request by operating each detection apparatus 20, the request is transmitted to the model providing apparatus 10 from the detection apparatus 20. A detection model for the detection apparatus 20 is generated in response to reception of the request.

The request may include information used for determining a content of a detection model for each detection apparatus 20. The information may include at least one type of information out of user identification information for identifying a user and selection information indicating a detection target object to be selected out of a plurality of detection target objects. The selection information may include at least one of the following first to third selection information examples.

First Selection Information Example

Selection information in the example indicates an environment in which a detection model is used. Specifically, the selection information includes a location (such as a country or a region name) where a detection apparatus 20 installed with the detection model is installed, a type of facility (such as a sports stadium, a concert hall, a corporate building, or an amusement facility) where the detection apparatus 20 installed with the detection model is installed, and the then intended use (such as a concert or a sports event) of the facility where the detection apparatus 20 installed with the detection model is installed.

Second Selection Information Example

Selection information in the example indicates a detection target object specified by a user. Specifically, the selection information indicates a detection target object specified by a user out of a plurality of detection target objects detectable by the machine learning model stored in the storage unit 11, such as a "pistol and a knife."

Third Selection Information Example

Selection information in the example indicates a keyword specified by a user. The keyword is used for selecting a predetermined detection target object out of a plurality of detection target objects detectable by the machine learning model stored in the storage unit 11. For example, a purpose of a belongings inspection or a word related thereto, such as "dangerous article," "safety of life," or "information security" is assumed to be the keyword.

The selection unit 13 selects at least one out of a plurality of detection target objects detectable by the machine learning model stored in the storage unit 11 every time the request reception unit 12 receives a request. The selection unit 13 may make the selection by using the aforementioned selection information and user identification information included in the request received by the request reception unit 12. For example, the selection unit 13 may execute at least one of the following first to fourth selection examples.

First Selection Example

The selection unit 13 in the example selects a detection target object, based on an environment in which a detection model indicated by selection information is used. The selection unit 13 selects a detection target object which is preferably detected (should be detected or is expected to be detected) in the environment indicated by the selection information.

Information associating each environment to be used with a suitable detection target object of a detection model to be used in the environment is previously generated and is preregistered in the model providing apparatus 10. The selection unit 13 can select a suitable detection target object, based on the associating information and the aforementioned selection information. An example is described below. The following example is strictly an example and a means for implementing the aforementioned configuration is not limited to the following example.

For example, a target country where detection is performed tied to a related keyword is registered for each detection target object, as illustrated in FIG. 4. Then, based on a previously held conversion dictionary (unillustrated), the selection unit 13 converts a type of facility (such as a sports stadium, a concert hall, a corporate building, or an amusement facility) where a detection model indicated by selection information is installed, the then intended use (such as a concert or a sports event) of the facility where the detection model is installed, or the like into a predetermined keyword (such as dangerous article or information security).

Then, the selection unit 13 selects a detection target object including, in target countries thereof, a country where the detection model indicated by the aforementioned selection information is installed and being tied to the aforementioned converted keyword.

Second Selection Example

The selection unit 13 in the example selects a detection target object specified by a user. For example, a plurality of detection target objects detectable by the machine learning model stored in the storage unit 11 are selectably displayed in list form on a display of a terminal operated by a user (such as a detection apparatus 20, a smartphone, a tablet terminal, a personal computer, and a mobile phone). Then, the user performs an operation of specifying a detection target object to be detected by a detection apparatus 20 in setting processing out of the detection target objects. The selection unit 13 acquires an operation content of the user and selects a detection target object specified by the user, based on the operation content.

Third Selection Example

The selection unit 13 in the example selects a detection target object, based on a keyword indicated by selection information. A related keyword tied to each of a plurality of detection target objects detectable by the machine learning model stored in the storage unit 11 is preregistered (see FIG. 4). The selection unit 13 selects a detection target object tied to a keyword indicated by the selection information out of the plurality of detection target objects detectable by the machine learning model stored in the storage unit 11.

Fourth Selection Example

The first selection example or the third selection example, and the second selection example are combined in the example. After selecting a detection target object in the first selection example or the third selection example, the selection unit 13 provides the selection result for a user. Subsequently, the user performs an operation of modifying the selection result. For example, the user newly selects an unselected detection target object or removes a selected detection target object from the selection. Then, the modified content is transmitted to the model providing apparatus 10. Provision of the selection result and acceptance of the modification operation are achieved through a terminal operated by the user, such as the detection apparatus 20, a smartphone, a tablet terminal, a personal computer, or a mobile phone.

Then, the selection unit 13 determines the selection result modified based on the modified content by the user to be a final selection result.

The generation unit 15 generates a detection model detecting a detection target object selected by the selection unit 13 and not detecting an unselected detection target object, based on the machine learning model stored in the storage unit 11. The detection model includes feature values (a feature value of the shape and a reflected wave feature value) of the selected detection target object as reference target feature values and does not include feature values (a feature value of the shape and a reflected wave feature value) of the unselected detection target object as reference target feature values.

The transmission unit 14 transmits a detection model generated by the generation unit 15 to the detection apparatus 20.

Figure 5:
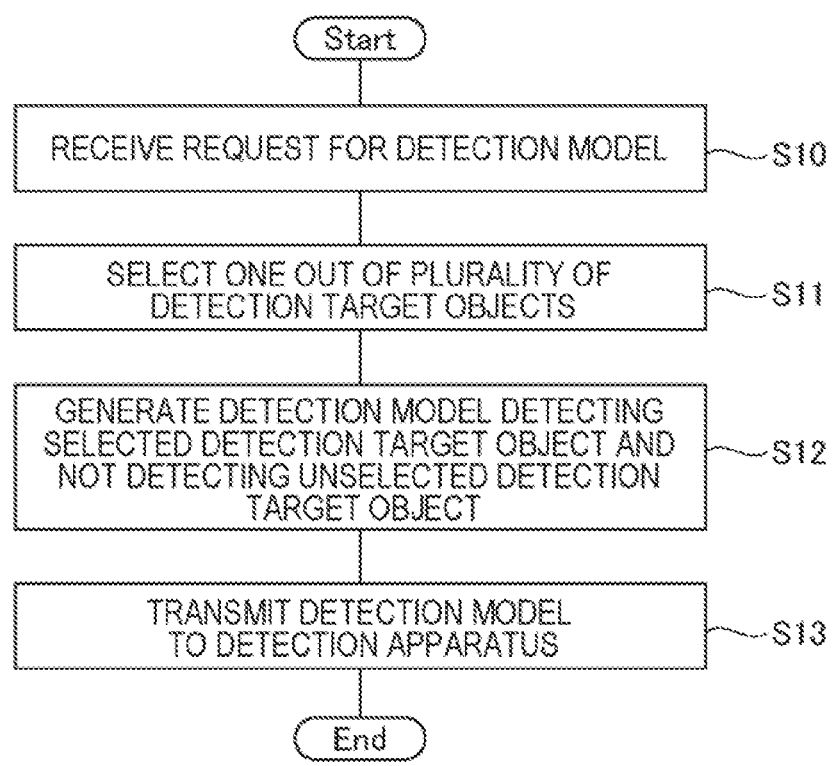
FIG. 5 is a flowchart illustrating an example of a flow of processing in the model providing apparatus according to the first example embodiment.

Next, an example of a flow of processing in the model providing apparatus 10 is described by using a flowchart in FIG. 5.

When receiving a request for a detection model (S10), the model providing apparatus 10 selects at least one out of a plurality of detection target objects detectable by the machine learning model stored in the storage unit 11 (S11). For example, the model providing apparatus 10 achieves the selection by executing one of the aforementioned first to fourth selection examples.

Subsequently, the model providing apparatus 10 generates a detection model detecting a selected detection target object and not detecting an unselected detection target object, based on the machine learning model (S12). The detection model includes feature values (a feature value of the shape and a reflected wave feature value) of the selected detection target object as reference target feature values and does not include feature values (a feature value of the shape and a reflected wave feature value) of the unselected detection target object as reference target feature values.

Next, the model providing apparatus 10 transmits the generated detection model to a predetermined detection apparatus 20 (S13).

Functional Configuration of Detection Apparatus 20

Figure 6:
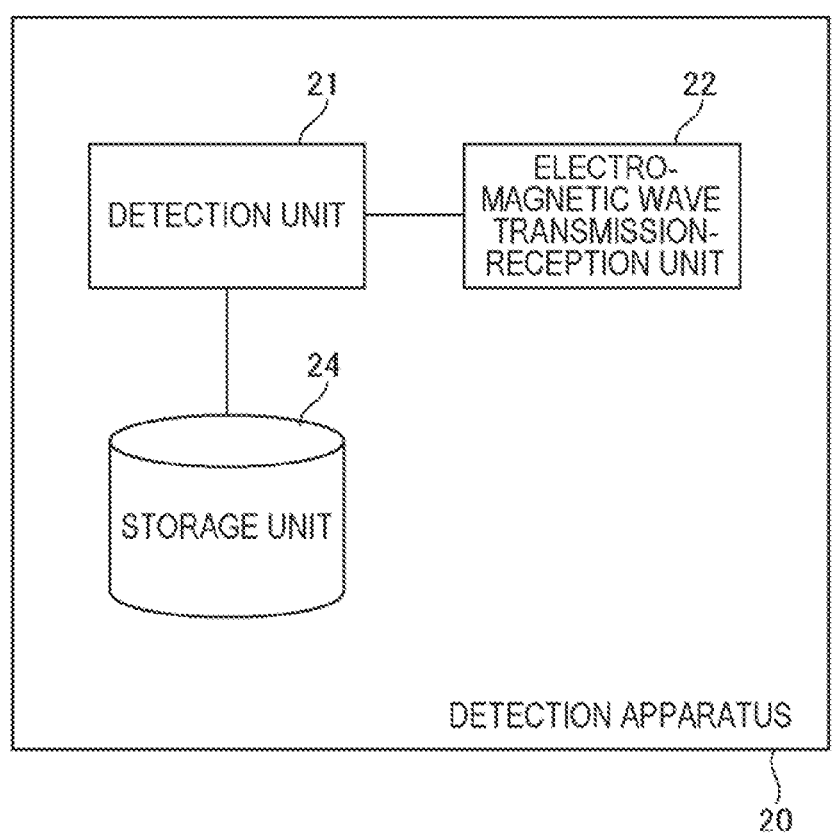
FIG. 6 is a diagram illustrating an example of a functional block diagram of a detection apparatus according to the first example embodiment.
Figure 7:
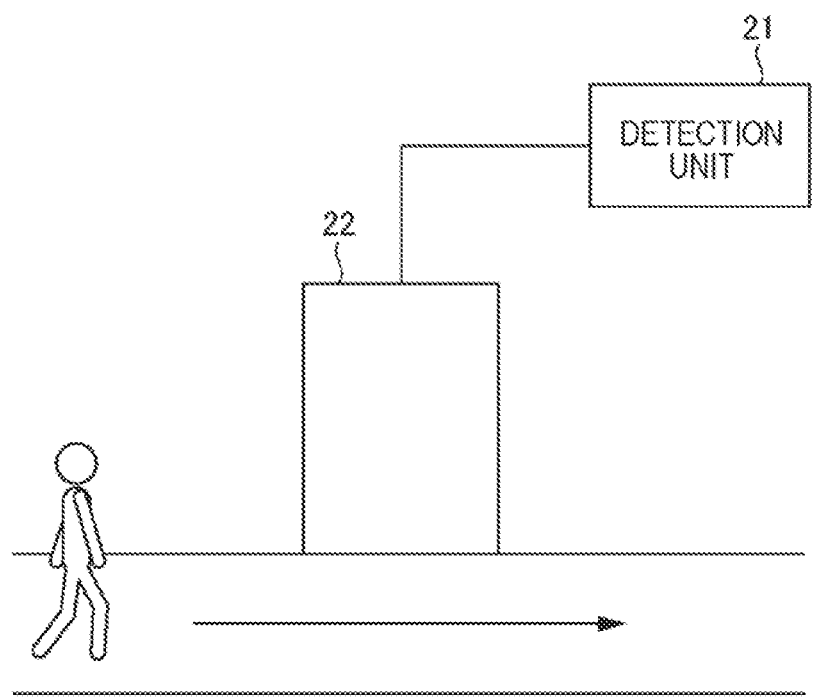
FIG. 7 is a diagram for schematically illustrating an example of an electromagnetic wave transmission-reception unit according to the first example embodiment.

Next, a functional configuration of the detection apparatus 20 is described. As illustrated in FIG. 6, the detection apparatus 20 includes a detection unit 21, an electromagnetic wave transmission-reception unit 22, and a storage unit 24. Processing in the detection unit 21 is achieved by a detection model downloaded from the model providing apparatus 10 being stored and installed into the storage unit 24.

The electromagnetic wave transmission-reception unit 22 projects an electromagnetic wave with a wavelength equal to or greater than 30 micrometers and equal to or less than 1 meter (such as a microwave, a millimeter wave, or a terahertz wave) to a person existing in a predetermined area and receives a reflected wave. Examples of the electromagnetic wave transmission-reception unit 22 include a radar. The electromagnetic wave transmission-reception unit 22 may be configured by employing every possible technology. For example, the electromagnetic wave transmission-reception unit 22 may be a sensor panel configured with a radar in which a plurality of antenna elements are arranged, as illustrated in an example in FIG. 7. A panel is an example, and the electromagnetic wave transmission-reception unit 22 may configured by using another technique such as a gate through which a person passes or a booth into which a person makes an entry.

The detection unit 21 determines whether a person existing in the predetermined area carries a preset detection target object, based on a signal of a reflected wave received by the electromagnetic wave transmission-reception unit 22. An example of determination processing is described below.

First Processing Example

The detection unit 21 in the example generates a transmission image, based on a signal of a reflected wave received by the electromagnetic wave transmission-reception unit 22. Then, the detection unit 21 detects a detection target object from the transmission image, based on the shape of an object appearing in the transmission image. When a detection target object is detected from the transmission image, a person existing in the predetermined area is determined to carry the detected detection target object. Processing of detecting a detection target object from a transmission image is achieved by executing the aforementioned detection model.

Second Processing Example

The detection unit 21 in the example determines whether a person existing in a predetermined area carries a preset detection target object, based on a feature value (reflected wave feature value) appearing in a signal of a reflected wave received by the electromagnetic wave transmission-reception unit 22. When a reflected wave feature value unique to the detection target object is detected from the signal of the reflected wave, the person existing in the predetermined area is determined to carry the detected detection target object. Processing of detecting a reflected wave feature value from a signal of a reflected wave is achieved by executing the aforementioned detection model.

The detection unit 21 can output a detection result through a predetermined output apparatus (such as a display, a speaker, a warning light, or a projection apparatus). For example, the output apparatus may be installed near each detection apparatus 20 and may provide predetermined information for an inspection target person or a manager managing inspections. Further, the detection unit 21 may vary an output mode of the output apparatus, based on a content of the detection result (whether a detection target object is detected). There are various ways of output, and every possible means may be employed in the present example embodiment.

Advantageous Effect

The model providing apparatus 10 according to the present example embodiment can generate a detection model detecting a suitable detection target object for each detection apparatus 20, based on a machine learning model that can detect a plurality of detection target object, and can provide each detection apparatus 20 with a detection model generated for the detection apparatus 20. As a result, for each of a plurality of detection apparatuses 20, a target object detected by the detection apparatus 20 can be easily set.

Further, the model providing apparatus 10 according to the present example embodiment can select a suitable detection target object out of a plurality of detection target objects, based on an environment in which a detection model is used, specification of a detection target object by a user, a keyword, or the like. Therefore, a user operation of selecting a suitable detection target object for each detection apparatus 20 out of a plurality of detection target objects can be easily performed.

Second Example Embodiment

A range of detectable detection target objects is set for each user by a contract, according to the present example embodiment. For example, a plurality of plans are prepared as illustrated in FIG. 8, and a user selects one of the plans and enters into a contract with an operator. For example, a range of detectable detection target objects of a plan A includes only dangerous articles such as a pistol and a knife, a range of a plan B includes all of a plurality of detection target objects detectable by a machine learning model stored in a storage unit 11, and so forth.

A selection unit 13 determines a contract content of a user identified by user identification information included in a request for a detection model, based on preregistered user contract information (see FIG. 8). Then, the selection unit 13 selects at least one out of detection target objects covered by the determined contract content (detection target objects included in a range of detectable detection target objects set to the user). Processing of selecting at least one out of detection target objects covered by the aforementioned contract content can be achieved by employing the technique described in the first example embodiment.

The remaining configuration of a model providing apparatus 10 is similar to that according to the first example embodiment. Further, the configuration of a detection apparatus 20 is similar to that according to the first example embodiment.

The model providing apparatus 10 according to the present example embodiment achieves advantageous effects similar to those of the first example embodiment. Further, the model providing apparatus 10 according to the present example embodiment can freely set a detection target object settable for each user. Such a model providing apparatus 10 enables use of only a truly necessary detection target object for each user, and therefore inconvenience such as cost increase due to overdesign of the detection apparatus 20 for each user can be suppressed.

Third Example Embodiment

A machine learning model stored in a storage unit 11 is regularly or irregularly updated, according to the present example embodiment. An updated content includes addition of a detection target object and an update to feature values (a feature value of the shape and a reflected wave feature value) of a previously registered detection target object. Then, a model providing apparatus 10 according to the present example embodiment executes predetermined processing in response to the update to the aforementioned machine learning model.

Figure 9:
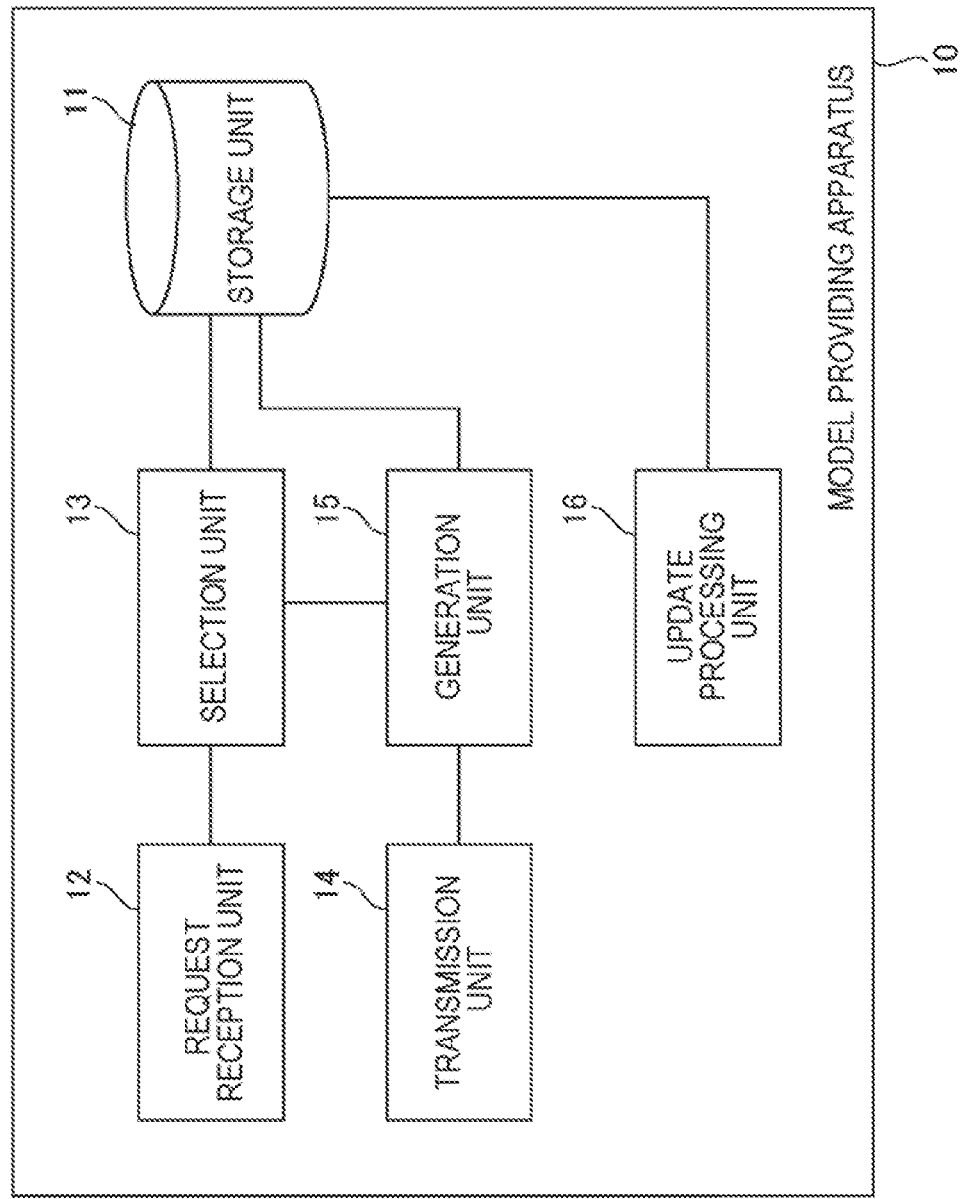
FIG. 9 is a diagram illustrating an example of a functional block diagram of a model providing apparatus according to a third example embodiment.

FIG. 9 illustrates an example of a functional block diagram of the model providing apparatus 10 according to the present example embodiment. As illustrated, the model providing apparatus 10 according to the present example embodiment differs from the model providing apparatuses 10 according to the first and second example embodiments in including an update processing unit 16.

When the machine learning model stored in the storage unit 11 is updated, the update processing unit 16 executes predetermined update processing. The update processing unit may execute at least one type of processing out of first to third update processing described below.

First Update Processing

When the machine learning model stored in the storage unit 11 is updated, the update processing unit 16 in the example notifies the update to a user. Then, when accepting an instruction input to update a detection model installed in a detection apparatus 20 from the user after the notification, the update processing unit 16 transmits an update program to the detection apparatus 20 in response. The detection apparatus 20 updates the previously installed detection model by executing the downloaded update program. Update notification and acceptance of the aforementioned instruction input are achieved through a terminal operated by the user, such as the detection apparatus 20, a smartphone, a tablet terminal, a personal computer, or a mobile phone.

Second Update Processing

When the machine learning model stored in the storage unit 11 is updated, the update processing unit 16 in the example transmits an update program to a detection apparatus 20 in response. The detection apparatus 20 updates a previously installed detection model by executing the downloaded update program.

Third Update Processing

When the machine learning model stored in the storage unit 11 is updated, the update processing unit 16 in the example determines a detection apparatus 20 requiring update processing based on the update.

For example, when a feature value (a feature value of the shape or a reflected wave feature value) of a previously registered detection target object is updated, the update processing unit 16 determines a detection apparatus 20 to which the detection target object the feature value of which is updated is set as a detection target at the time (a detection apparatus 20 previously downloaded with a pre-update feature value of the detection target object, the feature value being updated) to be a detection apparatus 20 requiring update processing.

For example, user setting information indicating a set content (a set detection target object) of a detection apparatus 20 of each user at the time is managed by the model providing apparatus 10, as illustrated in FIG. 10. Based on the user setting information, the update processing unit 16 can determine a detection apparatus 20 to which a detection target object a feature value of which is updated is set as a detection target at the time.

In addition, when feature values (a feature value of the shape and a reflected wave feature value) of a new detection target object are registered, the update processing unit 16 determines a detection target object the detection purpose of which matches that of the new detection target object. Examples of the detection purpose include "prevention of an injury case" and "prevention of information leakage." Then, the update processing unit 16 determines a detection apparatus 20 to which the detection target object the detection purpose of which matches that of the new detection target object is set as a detection target at the time (a detection apparatus 20 previously downloaded with feature values of the detection target object the detection purpose of which matches that of the new detection target object) to be a detection apparatus 20 requiring update processing.

Then, the update processing unit 16 executes the first update processing or the second update processing on the determined detection apparatus 20 requiring update processing.

The remaining configuration of the model providing apparatus 10 is similar to those according to the first and second example embodiments. Further, the configuration of the detection apparatus 20 is similar to those according to the first and second example embodiments.

The model providing apparatus 10 according to the present example embodiment achieves advantageous effects similar to those of the first and second example embodiments. Further, the model providing apparatus 10 according to the present example embodiment can also appropriately update detection models installed in a plurality of detection apparatuses 20 in response to update of the machine learning model stored in the storage unit 11. As a result, convenience is improved.

Modified Example

The detection apparatus 20 may be able to set a condition of detection processing, based on a user input. Examples of the condition of the detection processing include:

a warning is output when one of detection target objects A to M is detected, and a warning is not output when a detection target object N (such as a pass) is detected even when one of the detection target objects A to M is detected.

Thus, allowing a user to customize the condition improves convenience of the detection apparatus 20.

Note that "acquisition" herein includes at least one item out of: "an apparatus getting data stored in another apparatus or a storage medium (active acquisition)" in accordance with a user input or an instruction of a program, such as reception by making a request or an inquiry to another apparatus, or readout by accessing another apparatus or a storage medium; "an apparatus inputting data output from another apparatus to the apparatus (passive acquisition)" in accordance with a user input or an instruction of a program, such as reception of distributed (or, for example, transmitted or push notified) data, or acquisition by selection from received data or information; and "generating new data by data editing (such as conversion to text, data sorting, partial data extraction, or file format change) or the like and acquiring the new data."

The aforementioned example embodiments may also be described in whole or in part by the following supplementary notes, but are not limited thereto.

1. A model providing apparatus including:
    a storage means for storing a machine learning model detecting a plurality of detection target objects, based on a received signal of a reflected wave of an electromagnetic wave with a wavelength equal to or greater than 30 micrometers and equal to or less than 1 meter;
    a request reception means for receiving a request for a detection model detecting the detection target object, based on the received signal;
    a selection means for selecting at least one out of a plurality of the detection target objects for the each request;
    a generation means for generating the detection model detecting the selected detection target object and not detecting the unselected detection target object, based on the machine learning model; and
    a transmission means for transmitting the generated detection model to a detection apparatus.

2. The model providing apparatus according to 1, wherein
    the request reception means receives the request including selection information indicating the detection target object to be selected out of a plurality of the detection target objects, and
    the selection means selects at least one out of a plurality of the detection target objects, based on the selection information.

3. The model providing apparatus according to 2, wherein
    the selection information indicates an environment in which the detection model is used.

4. The model providing apparatus according to 2, wherein
    the selection information indicates the detection target object specified by a user.

5. The model providing apparatus according to 2, wherein
    the selection information indicates a keyword.

6. The model providing apparatus according to any one of 1 to 4, wherein
    the request reception means receives the request including user identification information for identifying a user using the detection model, and
    the selection means
        determines a contract content of a user identified by the user identification information, based on preregistered user contract information and selects at least one out of the one or more detection target objects covered by the contract content in a plurality of the detection target objects.

7. The model providing apparatus according to any one of 1 to 6, further including
an update processing means for, when the machine learning model is updated, notifying the update to a user.

8. The model providing apparatus according to 7, wherein the update processing means determines a user requiring update notification, based on the previously transmitted detection model and an updated content of the machine learning model and notifies update of the machine learning model to the determined user.

9. A model providing method including, by a computer:
storing a machine learning model detecting a plurality of detection target objects, based on a received signal of a reflected wave of an electromagnetic wave with a wavelength equal to or greater than 30 micrometers and equal to or less than 1 meter;
receiving a request for a detection model detecting the detection target object, based on the received signal;
selecting at least one out of a plurality of the detection target objects for the each request;
generating the detection model detecting the selected detection target object and not detecting the unselected detection target object, based on the machine learning model; and
transmitting the generated detection model to a detection apparatus.

10. A program causing a computer to function as:
a storage means for storing a machine learning model detecting a plurality of detection target objects, based on a received signal of a reflected wave of an electromagnetic wave with a wavelength equal to or greater than 30 micrometers and equal to or less than 1 meter;
a request reception means for receiving a request for a detection model detecting the detection target object, based on the received signal;
a selection means for selecting at least one out of a plurality of the detection target objects for the each request;
a generation means for generating the detection model detecting the selected detection target object and not detecting the unselected detection target object, based on the machine learning model; and
a transmission means for transmitting the generated detection model to a detection apparatus.

The invention claimed is:

1. A model providing apparatus for providing, to a detection apparatus in communication with the model providing apparatus, a detection model configured to detect at least one detection target object, the model providing apparatus comprising:
at least one memory configured to store one or more instructions; and
at least one processor coupled to the memory and configured to execute the one or more instructions to:
store, in the memory, a machine learning model configured to detect, based on a received signal, a plurality of detection target objects, the received signal being a signal of a reflected wave of an electromagnetic wave with a wavelength equal to or greater than 30 micrometers and equal to or less than 1 meter;
receive, from the detection apparatus, a request for the detection model;
select, based on the request, the at least one detection target object from the plurality of detection target objects;
generate, based on the machine learning model, and responsive to the request, the detection model to be configured to detect the at least one detection target object and to not detect at least one other detection target object of the plurality of detection target objects; and
transmit the generated detection model to the detection apparatus.

2. The model providing apparatus according to claim 1, wherein the processor is further configured to execute the one or more instructions to:
receive, from the request, selection information indicating the at least one detection target object to be selected, and
select, based on the selection information, the at least one detection target object.

3. The model providing apparatus according to claim 2, wherein
the selection information indicates an environment in which the detection model is used.

4. The model providing apparatus according to claim 2, wherein
the selection information indicates at least one selected detection target object specified by a user.

5. The model providing apparatus according to claim 2, wherein
the selection information indicates a keyword.

6. The model providing apparatus according to claim 1, wherein the processor is further configured to execute the one or more instructions to:
receive, from the request, user identification information for identifying a user requesting the detection model by the detection apparatus,
determine, based on preregistered user contract information, a contract content of the user identified by the user identification information, and
select the at least one detection target object from a range of detection target objects, in the plurality of detection target objects, covered by the contract content.

7. The model providing apparatus according to claim 1, wherein the processor is further configured to execute the one or more instructions to notify at least one user, when the machine learning model stored in the memory is updated.

8. The model providing apparatus according to claim 7, wherein the processor is further configured to execute the one or more instructions to determine the at least one user as a user requiring update notification, based on a previously transmitted detection model and an updated content of the machine learning model.

9. A model providing method for providing, to a detection apparatus in communication with the model providing apparatus, a detection model configured to detect at least one detection target object, the model providing method comprising, by at least one processor:
storing, in at least one memory, a machine learning model configured to detect, based on a received signal, a plurality of detection target objects, the received signal being a signal of a reflected wave of an electromagnetic wave with a wavelength equal to or greater than 30 micrometers and equal to or less than 1 meter;
receiving, from the detection apparatus, a request for a detection model;

selecting, based on the request, the at least one detection target object from the plurality of detection target objects;
generating, based on the machine learning model, and responsive to the request, the detection model to be configured to detect the at least one detection target object and to not detect at least one other detection target object of the plurality of detection target objects; and
transmitting the generated detection model to the detection apparatus.

10. A non-transitory storage medium storing a program which, when executed by at least one processor, causes the processor to:
store, in at least one memory, a machine learning model configured to detect, based on a received signal, a plurality of detection target objects, the received signal being a signal of a reflected wave of an electromagnetic wave with a wavelength equal to or greater than 30 micrometers and equal to or less than 1 meter;
receive, from a detection apparatus, a request for a detection model;
select, based on the request, at least one detection target object from the plurality of detection target objects;
generate, based on the machine learning model, and responsive to the request, the detection model to be configured to detect the at least one detection target object and to not detect at least one other detection target object of the plurality of detection target objects; and
transmit the generated detection model to the detection apparatus.

11. The model providing apparatus according to claim 1, wherein the processor is further configured to execute the one or more instructions to select, based on information included in the request, the at least one detection target object, the information indicating at least one of: an environment in which the detection model is used, a detection target object specified by a user, and a keyword.

* * * * *